US006326748B1

(12) United States Patent
Moroto et al.

(10) Patent No.: US 6,326,748 B1
(45) Date of Patent: Dec. 4, 2001

(54) BRUSHLESS MOTOR POWERED BY DC POWER SOURCE

(75) Inventors: Kiyonori Moroto, Kariya; Motoya Ito, Hekinan, both of (JP)

(73) Assignee: Denso Corporation, Kariya (JP)

( * ) Notice: Subject to any disclaimer, the term of this patent is extended or adjusted under 35 U.S.C. 154(b) by 20 days.

(21) Appl. No.: 09/583,859

(22) Filed: Jun. 1, 2000

(51) Int. Cl.$^7$ .............................. H02K 29/00; F04B 17/00
(52) U.S. Cl. .......................... 318/254; 318/439; 318/599; 417/44.1
(58) Field of Search ....................... 318/254, 439, 318/599, 650, 696, 806, 809–812; 417/44.1, 45

(56) References Cited

U.S. PATENT DOCUMENTS

| | | |
|---|---|---|
| 4,403,177 | * 9/1983 | Weber et al. ............... 318/254 |
| 4,740,734 | * 4/1988 | Takeuchi et al. ............ 318/254 |
| 4,950,968 | 8/1990 | Ogura . |
| 4,955,790 | * 9/1990 | Nakanishi et al. .......... 417/45 |
| 5,115,174 | 5/1992 | Masuda et al. . |

FOREIGN PATENT DOCUMENTS

| | | |
|---|---|---|
| A-57-25196 | 2/1982 | (JP) . |
| B2-2560855 | 9/1996 | (JP) . |

* cited by examiner

*Primary Examiner*—Khanh Dang
(74) *Attorney, Agent, or Firm*—Nixon & Vanderhye P.C.

(57) ABSTRACT

A brushless motor composed of a cylindrical stator and a magnet rotor rotatably supported in the stator is driven by a battery. The stator includes a multi-phase armature winding to which current is supplied from the battery through a drive-control circuit. The drive-control circuit includes switching elements that are selectively turned on and off to generate a rotating magnetic field in the stator. The switch-timing of the switching elements is controlled according to a rotational position of the rotor and the battery voltage. When the battery voltage is normal, the switch-timing is set to an optimum point so that a maximum efficiency of the brushless motor is obtained. When the battery voltage becomes low, the switch-timing is advanced to secure a required motor speed. Thus, the required motor speed is always secured without using additional devices such as a voltage stabilizer or a pulse-width modulation controller.

4 Claims, 5 Drawing Sheets

BRUSHLESS MOTOR POWERED BY DC POWER SOURCE

CROSS-REFERENCE TO RELATED APPLICATION

This application is based upon and claims benefit of priority of Japanese Patent Application No. Hei-11-161775 filed on Jun. 9, 1999, the content of which is incorporated herein by reference.

BACKGROUND OF THE INVENTION

1. Field of the Invention

The present invention relates to a brushless motor driven by a DC power source such as a battery, and more particularly to a brushless motor that drives a device mounted on an automotive vehicle such as a fuel pump.

2. Description of Related Art

A brushless motor is composed of a magnet rotor and a stator having a multi-phase armature winding and is driven by sequentially switching power supply to each phase winding of the armature winding. The power supply timing is controlled based on a rotational position of the magnet rotor detected by a rotor position detector such as a hall-effect element or by induction voltage of the armature winding. A rotational speed of the brushless motor (referred to as a motor speed) is dependent on a power source voltage, i.e., the motor speed decreases as the power source voltage decreases. It is therefore desirable to keep the power source voltage constant to drive the brushless motor at a constant speed.

However, when the power source is an on-board battery, its voltage varies according to various conditions. For example, the battery voltage decreases when the battery is exhausted, and especially it considerably drops when a stator motor is operated. If the motor speed decreases due to the battery voltage drop, a required power cannot be obtained from the motor. To cope with this problem, JP-B2-2560855 proposes to use a voltage stabilizer or a pulse-width modulation control circuit. Such a device, however, is costly and does not meet a cost level required.

SUMMARY OF THE INVENTION

The present invention has been made in view of the above-mentioned problem, and an object of the present invention is to provide an improved brushless motor in which the rotational speed decrease due to the battery voltage decrease is alleviated in a cost effective manner.

The brushless motor is composed of a cylindrical stator having a multi-phase armature winding and a rotor having plural permanent magnet poles. A drive-control circuit having switching elements is connected between a DC power source such as a battery and the armature winding. Electric current is supplied to the armature winding from the battery through the drive-control circuit. The switching elements in the drive-control circuit are sequentially and selectively turned on and off to generate a rotating magnetic field in the stator. The switch-timing of the switching elements is determined based on a rotational position of the rotor and a battery voltage detected by a voltage detector.

When the battery voltage is normal, i.e., the battery voltage is higher than a predetermined level, the switch-timing is set to an optimum point so that an efficiency of the brushless motor becomes maximum. On the other hand, when the battery voltage drops, i.e., the battery voltage becomes lower than the predetermined level, the switch-timing is advanced to secure a required rotational speed of the brushless motor. The amount of switch-timing advance may be a fixed amount or an amount determined according to the detected battery voltage.

Preferably, the multi-phase armature winding of the stator is connected in a star-connection forming a neutral point. The rotor position is detected based on a voltage induced in a phase winding to which current is not supplied, the induced voltage being determined from a voltage at the neutral point. The brushless motor may be integrated with a fuel pump for supplying fuel to an internal combustion engine to provide a compact fuel pump assembly.

According to the present invention, a required motor speed is secured even when the battery voltage becomes low by advancing the switch-timing of the switching elements, without using an additional voltage stabilezer or a pulse-width modulating controller. Moreover, the brushless motor can be operated with the highest efficiency when the battery voltage is normal.

Other objects and features of the present invention will become more readily apparent from a better understanding of the preferred embodiment described below with reference to the following drawings.

DETAILED DESCRIPTION OF THE PREFERRED EMBODIMENT

Figure 1:
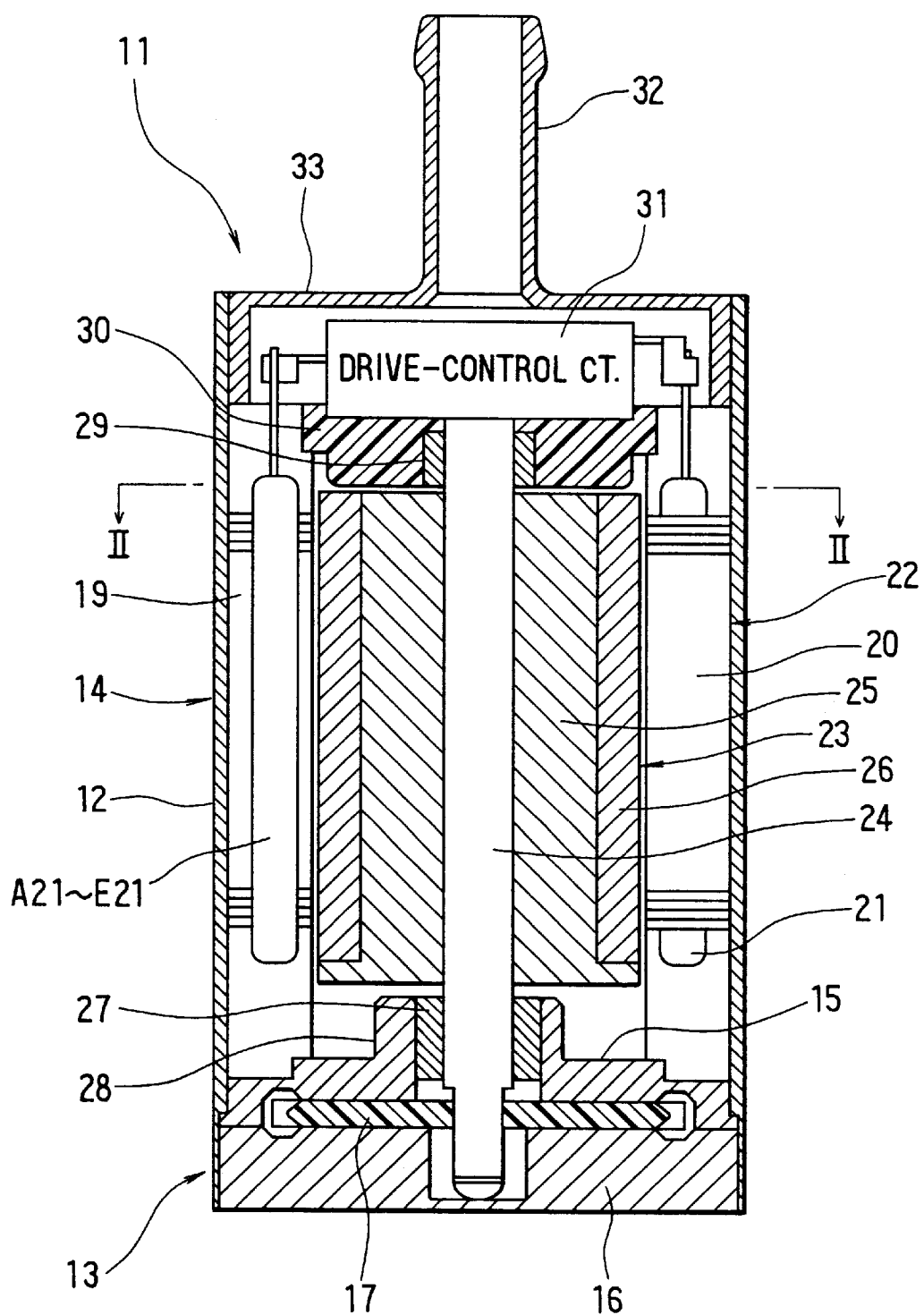
FIG. 1 is a cross-sectional view showing a fuel PUMP assembly in which a brushless motor according to the present invention is assembled.

A preferred embodiment of the present invention will be described in reference to the drawings. A brushless motor of the present invention is used in a fuel pump assembly mounted on an automotive vehicle and powered by an on-board battery. As shown in FIG. 1, a fuel pump assembly 11 is composed of a fuel pump 13 and a brushless motor 14 integrally housed in a cylindrical housing 12. The fuel pump 13 composed of a pump casing 15, a pump cover 16 and an impeller 17 is fixedly housed in the bottom portion of the housing 12. Both the pump casing 15 and the pump cover 16 are fixed to the housing 12 by caulking or press-fitting and form a pump chamber therebetween in which the impeller 17 is rotatably supported. The impeller 17 is fixedly connected to a shaft 24 of the brushless motor 14.

The brushless motor 14 is a motor driven by a five-phase armature winding and is composed of a cylindrical stator 19 fixedly housed in the housing 12 and a magnet rotor 23 rotatably supported in the housing 12. The bottom end of the shaft 24 is rotatably supported by a bearing 27 fixed to a bearing holder 28 of the pump casing 15. The upper end of the shaft 24 is rotatably supported by a bearing 29 held by a bearing holder 30 which is fixedly housed in the housing 12. A drive-control circuit 31 that controls power supply to the armature winding in the stator 19 is held by the bearing holder 30. A housing cover 33 having an outlet port 32 closes an open upper end of the cylindrical housing 12.

When the impeller 17 of the fuel pump 13 is driven by the brushless motor 14, fuel in a fuel tank (not shown) is sucked into the pumping chamber through an inlet port (not shown) and is pumped out from an outlet port (not shown) of the pumping chamber into an inner space of the housing 12. The fuel entered the housing 12 flows through a gap between the magnet rotor 23 and stator 19, and is supplied to injectors (not shown) through the outlet port 32.

Figure 2:
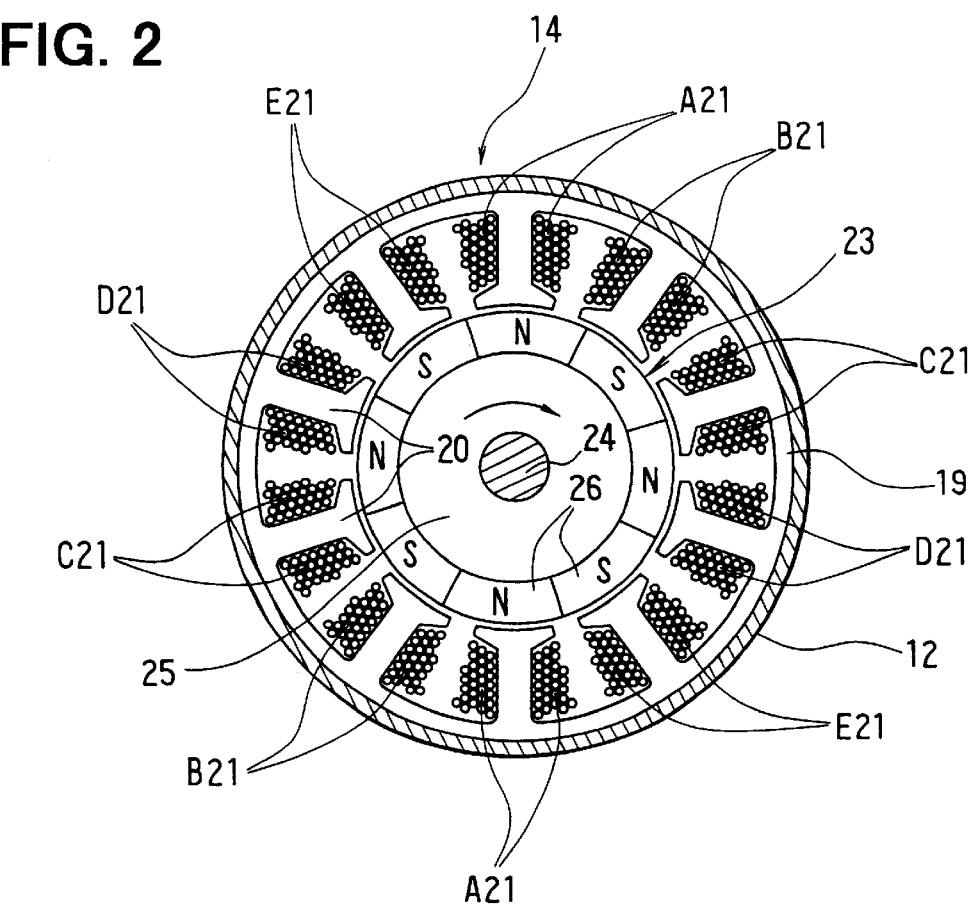
FIG. 2 is a cross-sectional view showing the brushless motor used in the fuel pump assembly, taken along a line II—II of FIG. 1.
Figure 3:
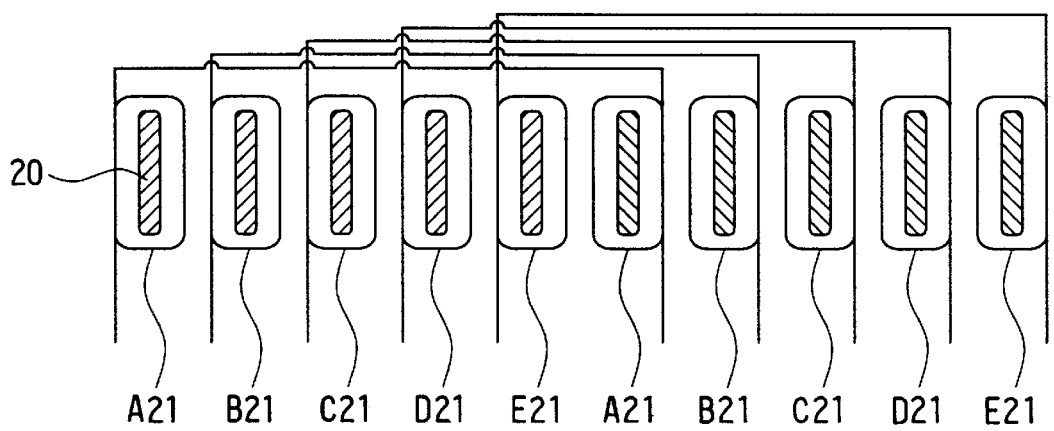
FIG. 3 is a schematic view showing electrical connection of each phase winding in an armature winding of the brushless motor.

FIG. 2 shows a cross-sectional view of the brushless motor 14, taken along line II—II of FIG. 1. The cylindrical stator 19 has ten poles 20 projected toward the magnet rotor 23. Armature coils A21–E21 constituting a five-phase (A-phase to E-phase) armature winding are wound on respective poles 20. As shown in FIG. 2, the coils A21, B21, C21, D21 and E21 are wound in this order, and this order is repeated one more time, forming 20 coils in total. As shown in FIG. 3, two coils of each phase are connected in series. Inside the stator 19, the magnet rotor 23 is rotatably disposed with an air gap therebetween. The magnet rotor 23 is composed of a rotor core 25 fixed to the shaft 24 and eight permanent magnets 26 fixedly connected to the outer periphery of the rotor core 25 with adhesive or the like. The permanent magnets 26 are magnetized so that an N-pole and an S-pole are alternately arranged. In place of eight permanent magnets 26, a single permanent magnet magnetized into plural poles may be used.

Figure 4:
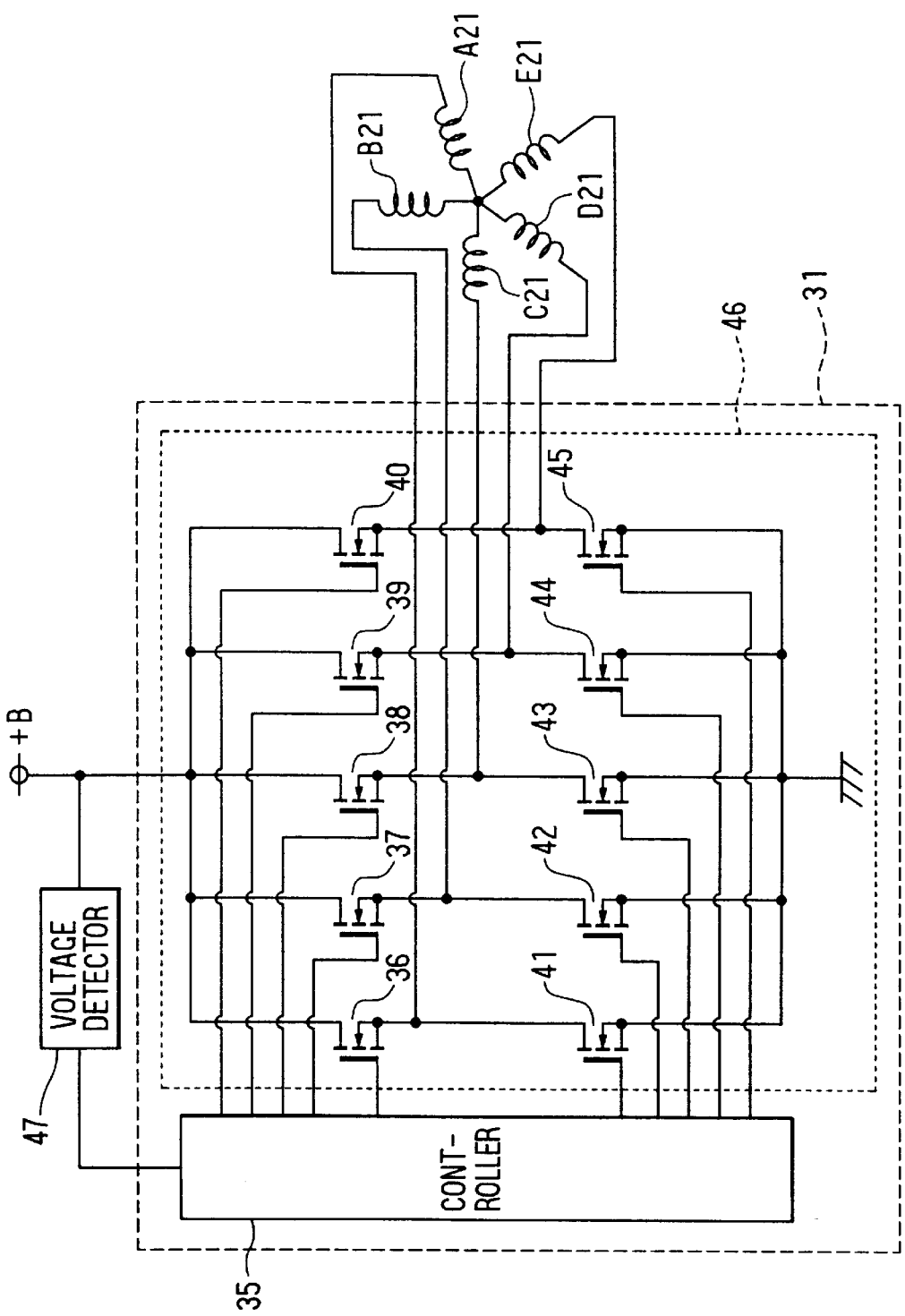
FIG. 4 is a circuit diagram showing electrical connection between a drive-controller and a brushless motor.

As shown in FIG. 4, the armature winding having five-phase coils A21–E21 connected in star-connection is connected to the DC power source, the battery, through the drive-control circuit 31. The drive-control circuit 31 includes switching circuit 46 and a controller 35. A voltage detector 47 for detecting the battery voltage is connected between the battery and the controller 35. The switching circuit 46 is composed of five upper arm MOSFETs 36, 37, 38, 39 and 40, and five lower arm MOSFETs 41, 42, 43, 44 and 45. An upper arm MOSFET and a lower arm MOSFET makes a pair of switching elements connected in series. Each pair of switching elements is connected between a plus terminal (+B) of the battery and the ground, and a junction of an upper MOSFET and a lower MOSFET of each pair of switching elements is connected to each coil A21–E21 connected in star-connection, as shown in FIG. 4. Five pairs of switching elements are connected in bridge connection.

The battery voltage detected by the voltage detector 47 is fed to the controller 35 in the drive-control circuit 31. The drive-control circuit 31 and the voltage detector 47 are integrated in a single IC chip in this particular embodiment. However, the battery voltage may be detected by a detector in a separate engine control circuit and may be fed to the drive-control circuit 31.

The drive-control circuit 31 drives the brushless motor 14 in a three-phase conduction method. That is, three coils are switched on (current is supplied) at a same time and two other coils are not. The switch-timing is controlled according to a rotational position of the magnet rotor 23 detected by the controller 35. The controller 35 detects a voltage induced in the coils that are not switched on, based on a neutral voltage. Namely, the rotational position of the magnet rotor 23 is detected according to the neutral voltage. Switching elements 36–45 are sequentially switched on and off according to the detected rotational position, as shown in FIG. 5, and thereby current is sequentially supplied to the five coils A21–E21.

The controller 35 always watches the battery voltage based on the signal fed from the voltage detector 47. When the battery voltage is higher than a predetermined level, the controller 35 sets the switch-timing to a fixed timing with which the motor efficiency becomes the highest (this timing is referred to as a normal timing). When the battery voltage is lower than the predetermined level, the controller 35 sets the switch-timing to an advanced timing. The process of setting the switch-timing is performed either in software or hardware. The predetermined level of the battery voltage is set to a level at which a minimum motor speed required for driving a load is secured when the armature winding is switched with the normal switch-timing.

Figure 5:
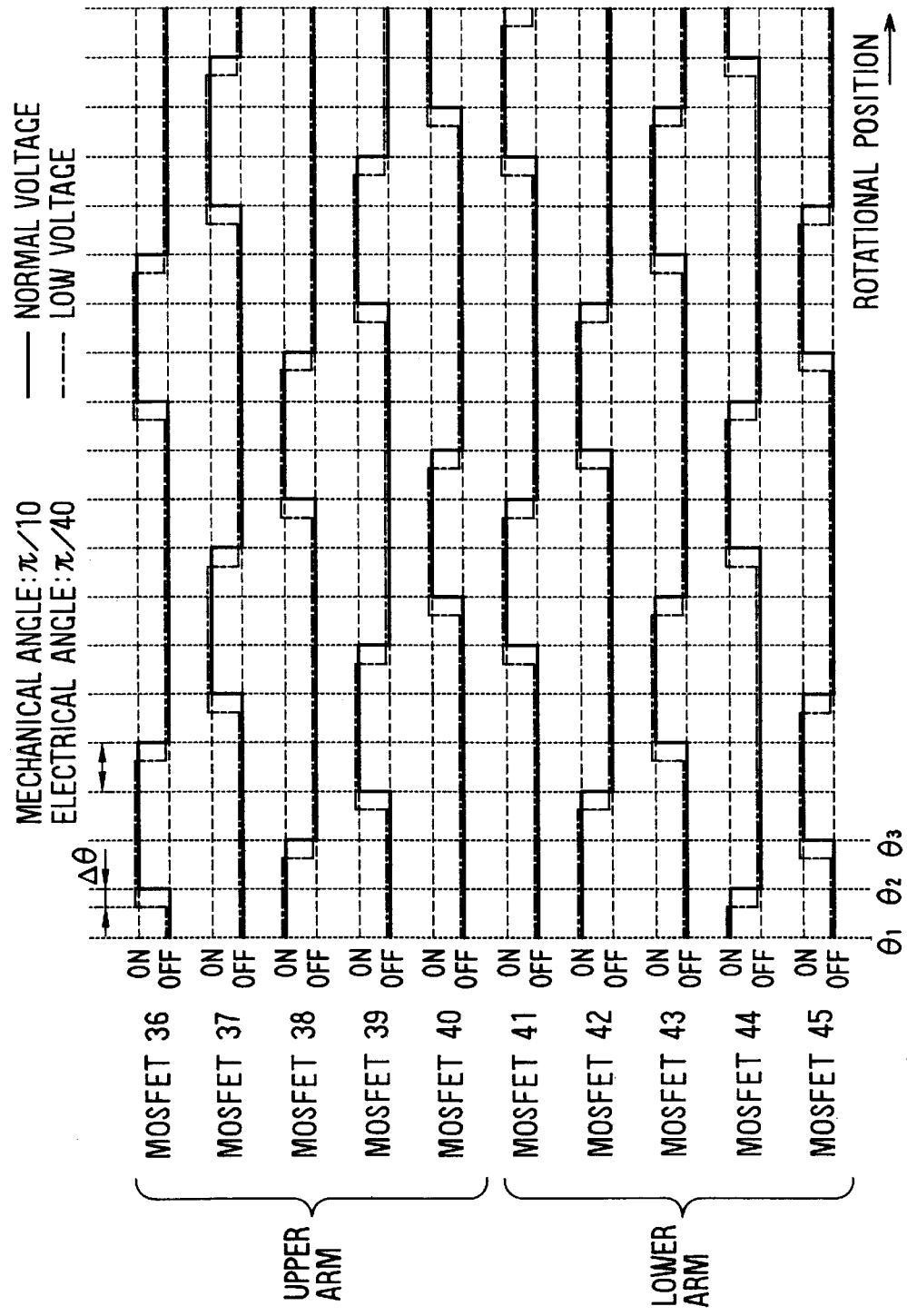
FIG. 5 is a chart showing switch-timing of MOSFETs connected to each phase winding of the armature winding.

Under the situation where the battery voltage is higher than the predetermined level, the MOSFETs 38, 42 and 44 are turned on at a time when the boundary of the N-pole and the S-pole of the magnet rotor 23 takes a position to face the respective stator poles carrying the coils B21, C21 and D21 (at the rotor position shown in FIG. 2 and at timing θ1 shown in FIG. 5). Thereby, current is supplied to the coils B21, C21 and D21 through a current passage from C21 to B21 and D21. Thereafter, when the N-S pole boundary takes a position to face the respective stator poles carrying the coils A21, B21 and C21 (at timing θ2 shown in FIG. 5), the MOSFET 44 is turned off while keeping the MOSFETs 38 and 42 turned on. Thereby, current is supplied to the coils A21, B21 and C21 through a current passage from A21 and C21 to B21.

In this manner, the upper and lower arm MOSFETS 36–45 are sequentially switched every rotational angle of π/40 in mechanical angle (π/10 in electrical angle) according to the rotational position of the magnet rotor 23. Thus, energized phases are sequentially switched phase by phase, and three coils corresponding to three phases are energized at the same time, thereby forming a rotating magnetic field in the stator 19 to drive the brushless motor.

On the other hand, under the situation where the battery voltage is lower than the predetermined level, the switch-timing is advanced by Δθ compared with the normal timing, as shown in FIG. 5. In other words, the energized phases are switched every time the rotor takes positions (θ1–Δθ), (θ2–Δθ), (Δ3–Δθ) . . . when the battery voltage is low, while those are switched every time the rotor takes positions θ1, θ2, θ2 . . . when the battery voltage is normal. The advanced angle Δθ may be set to either a constant value or a value that varies stepwise according to the battery voltage.

Figure 6:
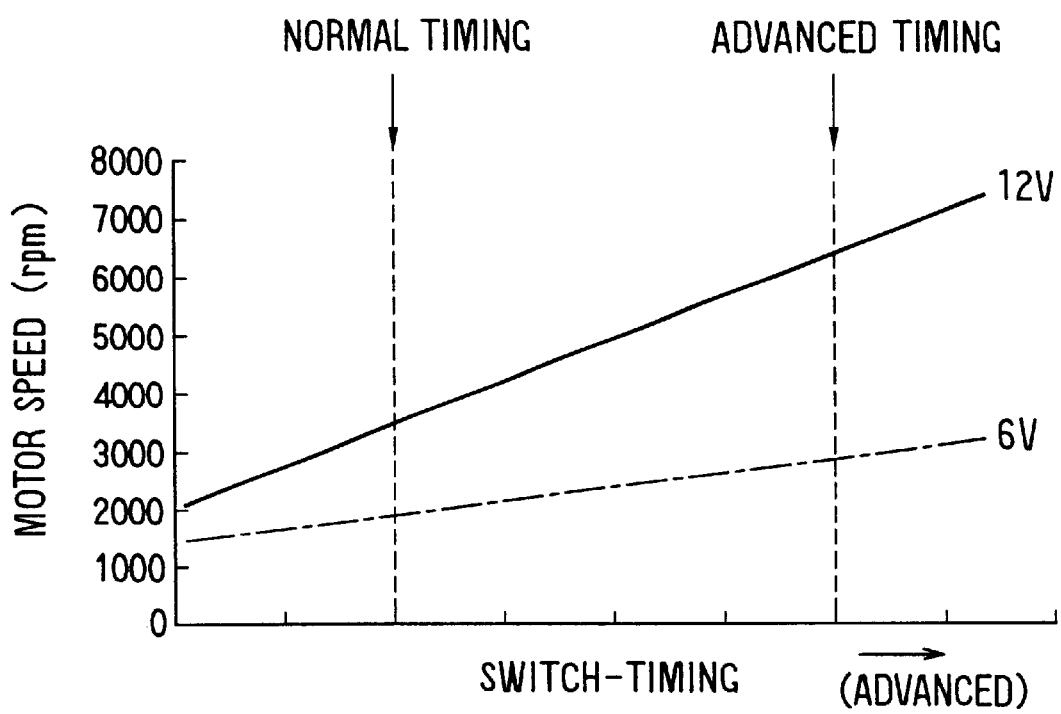
FIG. 6 is a graph showing the switch-timing under a normal battery voltage and a low battery voltage.

As shown in FIG. 6, the motor speed varies according to the switch-timing, i.e., the motor speed increases as the switch-timing advances. The motor speed vs. the switch-timing under the normal battery voltage (12 V) is shown with a solid line, and the same under the low battery voltage (6 V) is shown with a dotted line. Since the switch-timing is fixed irrespective of the battery voltage in a conventional brushless motor, the motor speed considerably decreases when the battery voltage drops. In the brushless motor according to the present invention, the switch-timing is advanced when the battery voltage becomes lower than the predetermined level. Therefore, the motor speed decrease due to the battery voltage drop is alleviated, and accordingly the motor speed required to drive a load is secured under a low battery voltage. For example, the fuel pump driven by the brushless motor is properly operated to supply a required amount of fuel to fuel injectors even when the battery voltage becomes lower than the predetermined level. It is not necessary to use an additional voltage stabilizer or a pulse-width modulation controller to secure the required motor speed.

The present invention is not limited to the embodiment described above, but it may be variously modified. For example, the switch-timing may be continuously varied according to the battery voltage, or may be changed with more than three steps. Though the three-phase energization method (the three phase coils to be energized are sequentially selected from among the five phase coils) is used in the embodiment described above, a four-phase energization method may be similarly employed. Moreover, the number of phases in the armature winding is not limited to five, but it may be four, six or higher. Similarly, the number of rotor poles is not limited to eight, but it may be arbitrarily varied.

The MOSFETs used as switching elements in the embodiment may be replaced with other elements. Also, the driving method is not limited to the full-wave driving method, but it may be a half-wave driving method. The armature winding may be connected in other ways than the star-connection. The switch-timing may be controlled based on the rotational position detected by a hall-effect element or the like. Further, various loads other than the fuel pump may be driven by the brushless motor of the present invention.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A brushless motor powered by a DC power source, the brushless motor comprising:

a cylindrical stator having an armature winding;

a rotor comprising a permanent magnet and rotatably supported in the stator;

a drive-control circuit, connected between the DC power source and the armature winding, for supplying electric current to the armature winding to generate a rotating magnetic field in the stator, the electric current supplied to the armature winding being sequentially turned on and off under a controlled switch-timing; and a voltage detector for detecting a voltage of the DC power source, wherein:

the switch-timing is set to a timing with which the brushless motor operates most efficiently, based on a rotational position of the rotor detected by the drive-control circuit, when the voltage of DC power source detected by the voltage detector is higher than a predetermined level; and the set switch-timing is advanced when the voltage of the power source becomes below the predetermined level to secure a required rotational speed of the brushless motor.

2. The brushless motor as in claim 1, wherein:

the brushless motor is used for driving a fuel pump for supplying fuel to an internal combustion engine.

3. The brushless motor as in claim 1, wherein:

the switch-timing is advanced by a predetermined amount when the voltage of the DC power source becomes below the predetermined level.

4. The brushless motor as in claim 1, wherein:

the armature winding is a multi-phase winding connected in star-connection forming a neutral point; and the rotational position of the rotor is detected based on a voltage induced in a phase winding to which current is not supplied, the induced voltage being determined from a voltage of the neutral point.

* * * * *